United States Patent [19]

Turunen

[11] Patent Number: 5,605,670
[45] Date of Patent: Feb. 25, 1997

[54] METHOD FOR PURIFYING HYDROGEN PEROXIDE

[75] Inventor: Ilkka Turunen, Oulu, Finland

[73] Assignee: Kemirachemicals Oy, Helsinki, Finland

[21] Appl. No.: 412,425

[22] Filed: Mar. 29, 1995

[30]   Foreign Application Priority Data

Sep. 21, 1994   [FI]   Finland ..................... 944373

[51] Int. Cl.⁶ ........................... C01B 15/01; C01B 15/023
[52] U.S. Cl. ........................... 423/584; 423/588
[58] Field of Search ..................... 423/584, 588

[56]         References Cited

U.S. PATENT DOCUMENTS 3,387,938  6/1968  Leaver ..................... 423/584
4,824,609  4/1989  Sethi ..................... 423/588
5,055,286  10/1991  Watanabe et al. ..................... 423/584

FOREIGN PATENT DOCUMENTS 1197655  7/1970  United Kingdom ..................... 423/584

*Primary Examiner*—Wayne Langel
*Attorney, Agent, or Firm*—Loeb & Loeb LLP

[57]            ABSTRACT

The invention relates to a method for purification hydrogen peroxide by extraction, wherein a) an aqueous solution of hydrogen peroxide containing impurities is brought into contact with a solvent which contains at least one substance dissolving impurities, for transferring the impurities from the aqueous solution of hydrogen peroxide to the solvent, and b) the aqueous solution of hydrogen peroxide, from which impurities have been removed, is separated from the solvent and recovered. Said substance which dissolves impurities is in a supercritical state.

14 Claims, 1 Drawing Sheet

METHOD FOR PURIFYING HYDROGEN PEROXIDE

The invention is related to a method for purifying hydrogen peroxide by extracting, wherein a) the aqueous solution of hydrogen peroxide containing impurities is brought into contact with a solvent which contains at least one substance which dissolves impurities, to transfer the impurities from the aqueous solution of the hydrogen peroxide into the solvent, and b) the aqueous solution of the hydrogen peroxide, from which impurities have been removed, is separated from the solvent and recovered. The purification method may be a part of the process of manufacture of the hydrogen peroxide or it can be a separate purification method independent of the process of manufacture. The invention is especially related to the purification of hydrogen peroxide from organic substances but it is also related to purification from other substances where applicable. For clarification it should be stated that hydrogen peroxide as a product almost always occurs in an aqueous solution. Consequently, purification of hydrogen peroxide herein always refers to removing impurities from the aqueous solution of hydrogen peroxide.

A major part of the hydrogen peroxide production in the world is currently carried out by the so-called anthraquinone process. This process is based on alternating hydrogenation and oxidation of alkyl anthraquinones. The alkyl anthraquinones are dissolved in a solvent formed by a number of organic substances. This solution, called a working solution, circulates continuously through the most essential stages of the process. In the hydrogenation stage the alkyl anthraquinones are hydrogenated catalytically into alkyl anthrahydroquinones. In the next stage, which is oxidation, the alkyl anthrahydroquinones react with oxygen, whereby they return to their original form, i.e., into alkyl anthraquinones. Hydrogen peroxide is created simultaneously.

The process stage following the oxidation is extraction in which the hydrogen peroxide dissolved in the working solution is extracted by water to separate it. An aqueous solution of hydrogen peroxide is thus obtained. From the extraction stage the working solution, from which the hydrogen peroxide is removed, is again pumped to hydrogenation via drying. After the extraction, the residue of organic substances is usually removed from the aqueous solution of hydrogen peroxide by a suitable purification method. After this the hydrogen peroxide is generally concentrated by distillation. In conjunction with the distillation, purification of hydrogen peroxide may also occur so that impurities are evaporated with water to be separated from the concentrated hydrogen peroxide obtained as a base product. More detailed information on the anthraquinone process is disclosed in "Ullmann's Encyclopedia of Industrial Chemistry", 5th edition, Vol. A13, pages 447–456.

The aqueous solution of hydrogen peroxide obtained from the extraction of anthraquinone process contains organic substances as impurities. These include the reacting compounds of the working solution, alkyl anthraquinones as well as the numerous organic substances contained in the solvent. In addition, from these components of the working solution other compounds are created chemically, a part of which ends up in the aqueous solution of the hydrogen peroxide. After the working solution has circulated in the process long enough, it contains, as a matter of fact, small mounts of such a large number of organic compounds that it is extremely difficult or impossible to identify all of them analytically.

When concentrating hydrogen peroxide by distillation, those organic impurities which are not evaporated away with water are concentrated into a strong hydrogen peroxide; in other words, their content is increased.

In several applications of use of hydrogen peroxide the organic impurities are a drawback which cannot be permitted. One drawback caused by organic impurities is that they easily render colour to the products. Colouring components include especially alkyl anthraquinones and their derivatives. In some applications an extremely pure product is required which is allowed to contain practically no organic substances. Therefore, the anthraquinone process generally comprises one or more purification stages in which organic substances are removed from the aqueous solution of the hydrogen peroxide. In addition, when extreme purity is required, the finished product has to be purified separately when needed.

A number of different methods have been used to purify hydrogen peroxide, including: distillation, extraction carded out by different organic solvents, adsorption of impurities into activated carbon, aluminium oxide, magnesium oxide or polymer resin, treatment with anion exchanger resin or cation exchanger resin as well as reverse osmosis.

Extraction with organic liquid is a very common purification method which is used to remove residues of organic substances from the aqueous solution of hydrogen peroxide. The anthraquinone processes often comprise a process stage based on this method, after the actual hydrogen peroxide extraction. The organic liquid to which the impurities are extracted, is generally the solvent compound of the working solution of the process or a component thereof. According to known literature, the solvents used include, for instance, xylene, methyl cyclohexanol acetate or a mixture of the above-mentioned substances (Ullman's Encyclopedia of Industrial Chemistry, 5th edition, Vol. A13, page 456). Publication GB 841 323 discloses extraction by a mixture of aromatic hydrocarbons the boiling point of which is between 145° and 200° C. There is an abundance of other publications which disclose the purification of hydrogen peroxide by extracting with organic liquid, for instance DE 10 36 225, DE 11 35 866, JP 35 2361.

The above-mentioned purification method wherein impurities are extracted into an organic liquid from hydrogen peroxide, more particularly from its aqueous solution, comprises several drawbacks which sometimes render the method unsuitable or disadvantageous. First, residues are unavoidably left in the hydrogen peroxide from the organic liquid which is used as the extraction solvent. Part of this residue is in a dissolved form in the aqueous solution of the hydrogen peroxide, part of it as a separate phase, in other words, as small liquid drops. As the requirements for purity are strict, as is generally the case, this residue of the organic solvent has to be removed from the aqueous solution of the hydrogen peroxide. Thus several purification stages are required; mere extraction by organic liquid is not sufficient. If the purification in question is a part of a conventional process of manufacture of hydrogen peroxide, the organic liquid used as the extraction solvent may be discharged during the rectification. However, there is a risk that other organic substances, such as anthraquinone derivatives, which are dissolved in the small drops formed by the organic liquid, are not discharged from the hydrogen peroxide, but on the contrary, are concentrated in it while the organic liquid evaporates.

Another drawback of the above-described method relates to the mass transfer efficiency. Mass transfer in this connection means that organic impurities are transferred from one phase into another, more particularly from the aqueous solution of the hydrogen peroxide to the organic solution functioning as the extraction solvent. The organic impurities must be removed from the hydrogen peroxide very accurately. The contents are in the order of a few hundreds or a few tens of mg/l, in the case of special grades sometimes even less than 10 mg of organic substance in one liter of hydrogen peroxide. To accomplish such low concentrations by liquid-liquid extraction is very difficult, as is well known. The difficulty arises because the driving force of the mass transfer, i.e., the concentration difference, is unavoidably very low when trying to achieve such low concentrations. When a low concentration difference is prevailing, a long retention time in the equipment and a very efficient dispersion is needed which is used to create a lot of interfacial area between the phases. Even with these preconditions it is difficult to accomplish extremely low concentrations in liquid-liquid extraction because the diffusion coefficient in the liquid is low and the density and viscosity high. It is considerably much easier to accomplish low concentrations in mass transfer operations between liquid and gas, such as distillation and absorption. It should be further noticed that dispersion, which is too efficient and can be necessary to enhance the mass transfer, easily causes difficulties when separating the phases from each other.

The third problem in the above-described purification method is safety. With compounds of the aqueous solution of hydrogen peroxide and organic liquids there is often the danger of explosion. Such is the case especially when a hydrogen peroxide solution with a concentration of over 40% is being handled.

For removing organic impurities, methods based on adsorption have also been disclosed, for instance, in publications U.S. Pat. No. 4,792,403, JP 7 126 095, DE 3 826 720, GB 1 197 655, GB 924 625. Impurities are adsorbed in polymer resin, activated carbon or magnesium or aluminium oxide, for instance. However, this purification method comprises a considerable safety risk. After a sufficient mount of adsorbing organic substance has been accumulated on the surface of the resin, for instance, it may ignite in oxidizing conditions. Hydrogen peroxide is, indeed, a strong oxidizer and there is a probability that a certain amount of pure oxygen always exists in an adsorption device, which is created when the hydrogen peroxide is decomposed.

Therefore, it is necessary to constantly monitor the accumulation of adsorbed organic substance very carefully and the adsorption material must be replaced frequently. In spite of this, such process units always comprise a safety risk which is not desirable in modem production processes. In addition, it should be noticed that because of its large specific surface, the adsorption mass generally decomposes hydrogen peroxide to a certain exent. This results in both economical loss and increased safety risk.

The object of the invention is a method for removing impurities, especially organic impurities, from the aqueous solution of hydrogen peroxide so that the drawbacks of conventional methods considered above are avoided or there are only a few of them. The invention is based on applying supercritical extraction in the purification of the aqueous solution of hydrogen peroxide. The essential characteristics of the invention are disclosed in the appended Claims.

As already mentioned, the invention relates to a method for purifying hydrogen peroxide by extraction, wherein the aqueous solution of hydrogen peroxide containing impurities is brought into contact with the extraction solvent, whereby impurities are transferred to the extraction solvent. Now it has been discovered that a more useful method is accomplished if the substance of the extraction solvent which dissolves impurities is kept in a supercritical state. The supercritical state means that the pressure is higher than the critical pressure of the substance in question and the temperature higher than the critical temperature of the substance in question. The critical pressure and temperature are physical properties of substances the values of which for the major part of conventional substances can be found in the literature.

According to the inventive idea the substance which dissolves impurities and is in the supercritical state is the more useful, the better it dissolves impurities of hydrogen peroxide and the easier it is to bring it into a supercritical state. One advantageous substance which dissolves impurities mentioned above is carbon dioxide, the critical pressure of which is 73.81 bar and the critical temperature $+31.3°$ C. The scope of the invention also includes purification methods of hydrogen peroxide based on extraction, wherein the pressure and temperature of the solvent are reasonably close to the critical pressure and temperature. The solvent may consist of a number of different substances. In this case it is preferable that the substance of the solvent which dissolves impurities comprises the main component of the solvent. The amount of the substance dissolving impurities and kept in a supercritical state is preferably over 90 percent by weight from the solvent.

According to an advantageous embodiment of the invention the solvent is regenerated by removing impurities from the solvent, after which the solvent is fed back to stage a). It is easy to separate from the supercritical solvent the impurities dissolved in it by reducing the pressure, whereby the solvent is vaporized. It is easy to separate organic impurities from the solvent vapour, either in liquid or solid form. Consequently, the solvent may be compressed again into the supercritical state and reused. Thus the same solvent would circulate in the process continuously and additional solvent would only be needed to replace a small loss.

The method according to the invention may be a unit process in the process of manufacture of hydrogen peroxide or it can be a separate purification method which is used to purify hydrogen peroxide for a certain use. One advantageous application of the invention is to use supercritical carbon dioxide as the solvent or as the main component of the solvent.

When carrying out purification tests in which the aqueous solution of hydrogen peroxide was extracted by supercritical carbon dioxide, surprisingly it was noticed that practically all the residue of the original components of the working solution were removed from the aqueous solution of hydrogen peroxide. Those organic impurities, which may have rendered colour to the hydrogen peroxide, i.e., mainly the anthraquinone derivatives, were completely discharged in the supercritical extraction. In a process based on the anthraquinone method, which works normally and without problems, removing of colour is generally a sufficient purification result.

The method according to the invention has several advantages when compared with the traditional purification methods of hydrogen peroxide.

First, the density difference between the supercritical substance and the aqueous solution of the hydrogen peroxide is fairly high, considerably higher than the density difference between the phases in the conventional liquid-liquid extraction.

Therefore, it is easy to separate the supercritical solvent from the hydrogen peroxide in the extraction device. The solvent in dissolved form remaining in the hydrogen peroxide is easy to remove, in turn, by reducing pressure after the extraction device, whereby the solvent in question is vaporized. For these reasons it seems that the conventional process of manufacture of hydrogen peroxide based on the anthraquinone method would only require one purification stage of the product, i.e., the supercritical extraction. In traditional technology, purification of raw peroxide may be effected in as many as four different stages: extraction by organic solvent; separation of the drops remaining from the solvent in question, using a drop separator; discharging of the last remains of the solvent in the rectification as well as possible adsorption by polymer resin, for example. It may be necessary to apply the last stage, especially in case of disturbances in the process as well as when a very strong hydrogen peroxide is manufactured. In this case the product may be coloured again in the rectification. On the basis of the tests performed, it seems quite possible that all these purification stages could be replaced by one operation, the supercritical extraction (the rectification, of course, would be needed because of concentration, but its role as a purification method would be unnecessary).

Low consumption of the solvent can be considered as another advantage of the method, as already mentioned.

As a third advantage of the method can be considered the fact that it is inherently suitable for removing very small impurity contents. This is due to the physical properties of the supercritical substance: the density, the viscosity, and the diffusion coefficient in the supercritical substance. They are between the correspondent values of liquid and gas. However, the density is so high that the dissolving power of supercritical substances is nearly in the order of liquids. A high diffusion coefficient and low viscosity, in turn, make the mass transfer much more effective than in liquid-liquid extraction, for instance. Therefore, impurities can be removed very accurately and relatively small size equipment is sufficient.

The fourth advantage of the method is safety when the supercritical substance to be used is carbon dioxide. As an inert and incombustible substance it can be used safely in connection with a hydrogen peroxide solution. The safety advantage is emphasized in the case of a strong hydrogen peroxide solution. Then the traditional methods, such as extraction with organic solvent and adsorption, are risky and even too dangerous to be applied to very strong hydrogen peroxide.

The fifth advantage of the method compared with traditional methods is a low hydrogen peroxide loss. The hydrogen peroxide is hardly decomposed in the method according to the invention, especially when the retention time can be kept low because of the high efficiency of the mass transfer.

The sixth advantage of the method is related to its convertability. As was stated above, supercritical carbon dioxide seems to be a sufficient solvent to remove all organic components originally present in the working solution from the aqueous solution of hydrogen peroxide. In addition, it removes part of the by-products created by the original components, for instance, a major part of the phenolic compounds. However, there can be many different by-products and all of them cannot be removed by one solvent. However, the dissolving properties of the supercritical substance can be modified by adding different cosolvents or additives to the main solvent. In this way, using the cosolvents or additives, the method can also be applied when special purity requirements are prevailing. In this connection additives or cosolvents, such as different polar, organic compounds, such as alcohols, can be applied. They increase the solubility of polar impurities into the main solvent.

It is stated in the above description that the invention is directed to the purification of hydrogen peroxide mainly from organic substances, but also from other substances when applicable. The invention can be used to remove inorganic ions from hydrogen peroxide solutions so that, to the solution to be purified, a suitable chelating agent is added, binding the ions into a compound which is dissolved in the supercritical solvent. This method is especially well-adapted to the removing of metal ions, such as ferric and chromic ions. In principle, a similar method can be used to remove anions, such as the phosphate ion, from the aqueous solution of hydrogen peroxide. Then the additive used forms compounds with the anion which are dissolved in the supercritical solvent.

Figure 1:
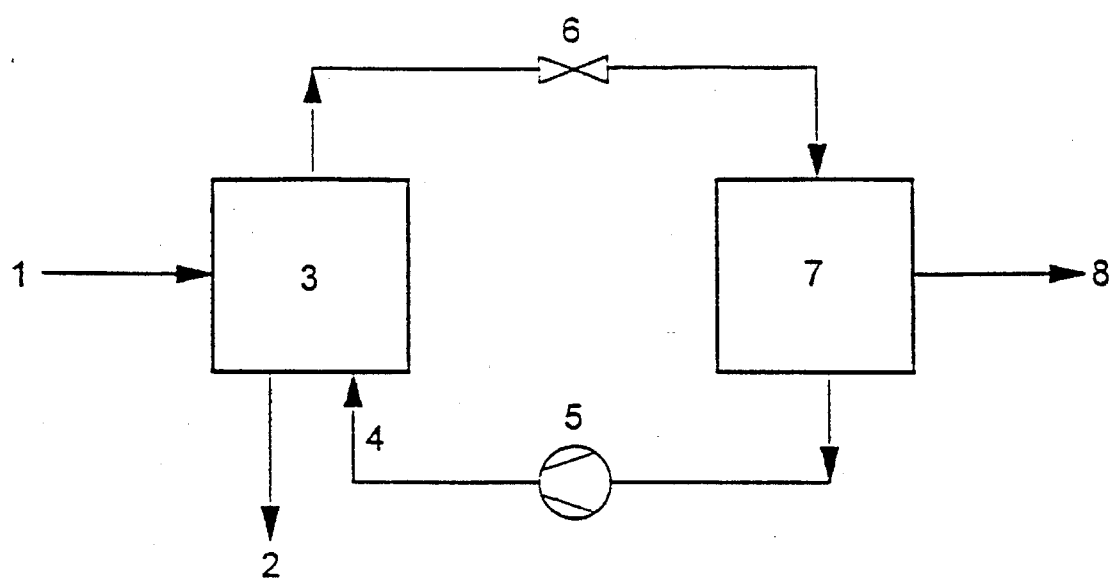
FIG. 1 shows a schematic principle figure of the process equipment which can be used to implement the purification method according to the invention. However, this is only an example and the method according to the invention can be realized in other types of equipment as well.

Reference number 1 in FIG. 1 refers to a hydrogen peroxide stream to be purified, which is, therefore, an aqueous solution of hydrogen peroxide containing impurities. It is fed to extraction device 3 to which also supercritical substance 4 is fed simultaneously. The extraction device can either be an empty process container or for instance, a packed column or a plate column. The purified aqueous solution 2 of hydrogen peroxide, from which impurities have been extracted, is discharged from the extraction device. The pressure of the supercritical substance discharging from the extraction device is reduced with valve 6, impurities 8 are separated from it in separator 7, and it is recompressed into supercritical state using compressor 5. The equipment naturally contains heat exchangers which have been omitted in the schematic illustration of FIG. 1.

EXAMPLES

In order to examine the performance of the purification method a number of tests were carried out. The aqueous solution of hydrogen peroxide taken from the process of manufacture of hydrogen peroxide was used as the solution to be purified, the content of hydrogen peroxide of the aqueous solution being c. 30–40%. The solution was taken from the process after the extraction stage, whereby it contained organic impurities both in dissolved form and as a separate phase. In the process of manufacture of hydrogen peroxide in question aromatic hydrocarbons and trioctyl phosphate are used as solvents in the working solution. The following impurities were found in the aqueous solution of hydrogen peroxide to be purified: ethyl anthraquinone and its different derivatives, aromatic hydrocarbons, trioctyl phosphate and phenolic compounds. In addition, the solution contained unknown polar organic impurities.

EXAMPLE 1

The test was carried out in an autoclave containing 0.5 liters of aqueous solution of hydrogen peroxide to be purified. 40 l/h (NTP) of carbon dioxide was conducted through the autoclave at a pressure of 170 bar and at 35° C. Before the purification the solution contained 3.2 mg/l of ethyl anthraquinone and its derivatives, 28 mg/l of aromatic hydrocarbons, and 20 mg of phenolic compounds. After the three hour test the solution contained less than 0.1 mg/l of ethyl anthraquinones and its derivatives, less than 1 mg/l of aromatic hydrocarbons, and 1 mg/l of phenolic compounds. The total carbon content was reduced in the test from the value of 145 mg/l to the value of 84 mg/l.

EXAMPLE 2

The second test was made in a packed column which was operated countercurrently and continuously. The continuous phase in the column was supercritical carbon dioxide and it was flowing slowly upwards. The liquid to be purified, aqueous hydrogen peroxide; was flowing downwards in the form of small drops. The column was filed with metallic packing. The inner diameter of the column was 58 mm and the packed heigth was 3 m.

The pressure in the column was 175 bar and temperature 35° C. Hydrogen peroxide feed was 19.7 kg/h and carbon dioxide feed 41.3 kWh. The feed stream contained anthraquinone compounds 0.09 mg/l, aromatic hydrocarbons 3.0 mg/l and phenolic compounds 11.8 mg/l. The purified stream contained no anthraquinone compounds, aromatic hydrocarbons 1.3 mg/l and phenolic compounds 1.7 mg/l.

EXAMPLE 3

The third test was made in a tube equipped with static mixers. The aqueous hydrogen peroxide and supercritical carbon dioxide were flowing concurrently through this tube. The inner diameter of the tube was 6 mm and the length was 4 m.

The pressure at the tube inlet was 175 bar and temperature 35° C. The hydrogen peroxide flowrate was 19.7 kgh and the carbon dioxide flowrate 41.3 kg/h. The hydrogen peroxide feed stream contained anthraquinone compounds 8.44 mg/l, triocryl phosphate 0.62 mg/l, aromatic hydrocarbons 31 mg/l, octanol 12 mg/l and phenolic compounds 147 mg/l. After the tube the streams were separated and the peroxide stream contained anthraquinone compounds 0.42 mg/l, no trioctyl phosphate at all, aromatic hydrocarbons 2 mg/l, octanol 0.4 mg/l and phenolic compounds 8 mg/l.

I claim:

1. A method for purification of hydrogen peroxide by extraction, the method comprising the steps of:

a) contacting a hydrogen peroxide aqueous solution containing impurities with a solvent comprising at least one substance which dissolves the impurities, for transferring the impurities from the hydrogen peroxide aqueous solution to the solvent, b) separating the hydrogen peroxide aqueous solution, from which the impurities have been removed, from the solvent, and c) recovering the separated hydrogen peroxide aqueous solution, wherein said substance which dissolves the impurities is in a supercritical state.

2. A method according to claim 1, further comprising steps of regenerating the solvent by removing the impurities from the solvent, and utilizing the regenerated solvent in step a).

3. A method according to claim 2, wherein said solvent has a pressure, and said regenerating step is carried out by reducing the pressure of the solvent below its critical pressure.

4. A method according to claim 1, wherein the solvent contains over 90 percent by weight of said substance which dissolves the impurities.

5. A method according to claim 1, wherein the substance which dissolves the impurities is carbon dioxide.

6. A method according to claim 1, wherein the solvent comprises a material selected from the group consisting of an additive, a cosolvent and an entrainer which material improves the ability of the solvent to dissolve organic impurities.

7. A method according to claim 6, wherein said additive is a polar organic compound.

8. A method according to claim 1, wherein said impurities have an ionic part, and wherein in step a) a chelating agent is added to the hydrogen peroxide aqueous solution, and the chelating agent forms a complex with the ionic part of the impurities, which complex is soluble in the supercritical substance.

9. A method according to claim 8, wherein the chelating agent is a compound which binds metal ions into compounds which are dissolved in the supercritical substance.

10. A method according to claim 8, wherein the chelating agent is a compound which binds anions into compounds which are dissolved in the supercritical substance.

11. A method according to claim 7, wherein said polar organic compound is an alcohol.

12. A method according to claim 8, wherein said substance is carbon dioxide.

13. A method according to claim 9, wherein said metal ions are ferric and/or chromic ions.

14. A method according to claim 10, wherein said anions are phosphate ions.

* * * * *